United States Patent [19]

Nilsson

[11] Patent Number: 4,618,549
[45] Date of Patent: Oct. 21, 1986

[54] SANDWICH ELECTRODE AND A BATTERY COMPRISING THE SAME

[76] Inventor: Ove K. G. Nilsson, Utterstigen 1, S-440 41 Nol, Sweden

[21] Appl. No.: 653,241

[22] PCT Filed: Jan. 13, 1984

[86] PCT No.: PCT/SE84/00007
§ 371 Date: Sep. 12, 1984
§ 102(e) Date: Sep. 12, 1984

[87] PCT Pub. No.: WO84/02806
PCT Pub. Date: Jul. 19, 1984

[30] Foreign Application Priority Data

Jan. 13, 1983 [SE] Sweden ............... 8300141
May 19, 1983 [SE] Sweden ............... 8302808

[51] Int. Cl.⁴ .................. H01M 4/70; H01M 4/76
[52] U.S. Cl. .................. 429/234; 429/238; 429/239; 29/623.1
[58] Field of Search .......... 429/234, 238, 239; 29/623.1

[56] References Cited

U.S. PATENT DOCUMENTS

| | | | |
|---|---|---|---|
| 969,876 | 9/1910 | Johnson | 429/234 |
| 1,509,992 | 9/1924 | Allen | 429/239 |
| 3,247,023 | 4/1966 | Geissbauer | 429/234 |
| 4,285,121 | 8/1981 | Guimond et al. | 29/623.1 |
| 4,331,747 | 5/1982 | Julian et al. | 429/234 |

*Primary Examiner*—Donald L. Walton
*Attorney, Agent, or Firm*—Hill, Van Santen, Steadman & Simpson

[57] ABSTRACT

An electrode for a lead acid battery, comprising a frame of an acid resistant plastic material which holds a current grid and active material covered by a porous previous web or the like, characterized in that the electrode comprises two or more portions, each one constituting a frame portion of plastic material having a grid and surrounding active material disposed in shallow troughs and covered by a web or the like on one side thereof, and adapted to be put together with a similar frame portion, back to back, so as to jointly form the electrode.

5 Claims, 15 Drawing Figures

SANDWICH ELECTRODE AND A BATTERY COMPRISING THE SAME

BACKGROUND OF THE INVENTION

1. Field of the Invention

The present invention relates to a method of making electrodes for storage batteries of the lead-acid class.

Further, the invention relates to an improved electrode for storage batteries of the lead-acid class, and to an improved storage battery comprising such electrodes.

2. Description of the Prior Art

Electrodes for lead acid batteries are made essentially according to two principles, viz. pasted electrodes and tubular electrodes.

The first mentioned type comprises a grid which holds a dough (paste) of a mixture of lead oxides, water and sulphuric acid. If the electrode is intended to constitute a negative electrode (i.e. being used as the anode in the battery during discharge) also carbon black, barium sulphate and lignine are added. The dough is pasted into the grid, either manually or by means of any suitable equipment. The grid is cast in one piece of lead or a lead alloy and has the tasks of carrying the paste, which in the formed condition constitutes the active material, and conducting current to and from the active material. The grid may have different configurations to serve its purpose. Very often some of its spines are mutually somewhat displaced to enhance the ability of the grid to hold the active material. The grid also has a lug for the connection of other electrodes of the same kind in parallel, via a post strap, to a post, where a cable can be connected.

Tubular electrodes have a different grid design in that a number of straight and parallel spines are connected to an upper frame which has a lug. Also this kind of grid is cast in one piece. Porous tubes with a round, elliptic or square cross-section are thread on to the spines. To locate the spines centrally of each tube, the spines are provided with small protrusions or fins. The length of the tube is at least the same as that of the spine. The tubes are fixed to the grid only by pushing them on to the upper, conical parts of the spines. The application of the material, which after electro-chemical formation will constitute the positive active material, is made by turning the open ends of the tubes upwardly and filling a powder or a slurry of leady oxides into the tubes. Since the filling material is usually not a free flowing material, grid and tubes have to be vigorously shaken and vibrated during this operation. When the appropriate amount of material has been filled into the tubes, the ends have to be sealed by means of a bottom bar of plastic, which is pressed into the tubes. For the subsequent operation it is necessary that the bottom bar is well anchored. The tubes may be used either individually—one for each spine—or as a group of tubes, sewn or woven together. There could also be more than one spine in a tube.

Sometimes another element is added to the tubular electrode, viz. an enclosure of plastic arranged around the upper frame to protect it against corrosion. Such an arrangement also decreases the amount of antimony that can be dissolved from the frame. Furthermore, the portion of the current which passes from the upper frame to the negative electrodes is first forced through the positive active material, which means a higher current efficiency.

The porous tubes are made from braided or woven glass or polyester. Glass is very resistant to oxidation in the environment created by oxygen evolved on lead dioxide during charging, but must be supported and protected by a perforated sheet of e.g. PVC. Polyester tubes are impregnated by fenolic resin for the same reason. Very often the tubes are made from felted (non-woven) materials such as polyester. The properties of the tubing material shall be: high porosity to permit fast acid diffusion into the electrode and good mechanical strength to support the active material and retain it in the electrode.

The dough or powder applied to the grids and comprising lead compounds, must be transformed to lead dioxide in the positive electrode and to porous lead in the negative one by an electro-chemical process (formation) before the electrodes will be able to deliver any electricity. Before that, however, the pasted electrodes have to be cured, i.e. the paste must be dried in a special way so that no cracks are formed and so that a suitable mixture of lead compounds is formed from the paste. The metallic lead must also be oxidized in this process. The tubular electrodes have to be sprayed by or dipped into sulphuric acid ("sulfation") to bind the lead compounds and to let the acid react with the lead oxide in the filling material, whether it is applied as a dry powder or a slurry. If the material has been filled into the tubes as a granulated powder, which actually is free flowing, it probably already has been treated with sulphuric acid and the plates do not need to be processed further. The sulfation could last for between a few minutes to more than 20 hours, depending on the subsequent operations. Then, after a short rinse and drying, the electrodes are ready for the electro-chemical formation.

Characteristic for the properties of pasted electrodes is the relatively inexpensive way of manufacture, as pasting can proceed at a high rate. The electrodes are often made thin, especially if they are to be used in batteries for high current discharges. As there is no protecting cover on pasted electrodes, shedding of the active material will occur after a relatively short period of use. This is due to the expansion of the material itself and also due to the growth of the grid caused by anodic corrosion. By adding an extra separator—a retainer mat—when assembling the electrodes to a battery, the shedding can to some extent be delayed. Also the risk of handling the electrodes in production should be realized: the active material is not entirely bound at the curing process but has a strong tendency to give off leady dust.

By enclosing the active material in tubes and having the grid in the center of these tubes, a substantial increase of the battery life is obtained, because the active material is retained by the tubing and the conducting lead spine is much better protected from anodic corrosion than in pasted electrodes. Furthermore, a much higher porosity of the active material can be permitted, which increases the utilization of the material. The spine in the center of the tube will provide for an even current distribution at least in a horizontal cross section. No shielding effect can occur as is the case with pasted electrodes. The disadvantage of tubular electrodes, besides the extra cost for the tubing, is the high production cost. Usually, the tubes have a diameter of 6–10 mm, the spine has a diameter of about 3 mm and the length of the tubes to be filled can be more than 500 mm. The filling of these tubes through the open ends is a very slow process going on by heavy shaking and vibrations, which also causes an environmental hazard by the lead dust. After filling, the bottom bar shall be applied to 15–20 such tube openings simultaneously. It is also evident that it is difficult to fill the tubes evenly and to control attainment of a predetermined filling degree.

When the electrodes have been fully formed and dried they are assembled to batteries. It is also possible to assemble unformed plates and then form them in the battery in an acid having a lower concentration than the acid filled into batteries with already formed electrodes. A battery consists of one or several cell units, each one of which has a cell voltage of about 2.1 volt when no current is passing through the cell. The cell is built up of a number of positive and negative electrodes (the negative ones always being pasted electrodes) separated by microporous membranes of plastic, paper or glass wool) to prevent short circuits. The same kind of electrodes are connected in parallel and to a post strap and thereafter introduced into a cell jar. Mostly the outer electrodes are of the negative kind and thus a cell has one negative electrode more than it has positive ones.

The capacity which will be discharged from the battery depends on the magnitude of the discharge current, whereas the time during which this current can be drained from the battery depends on a lot of factors. Some factors could be considered as external, i.e. the ambient temperature and the voltage to which the battery shall be discharged without jeopardizing the function of the electric equipment it is supposed to serve. The internal factors are evidently the positive and negative active material and the amount of acid. It is important how these active materials are distributed and arranged in the cell, e.g. the porosity and the electrode thickness. A high porosity and a thin electrode usually give a higher capacity than a thick electrode with low porosity, but suffer from a shorter life. Some acid is located in the pores of the electrodes, which actually is the best place since acid must be available at the reaction sites. However, not all of the acid necessary to utilize the active material can be located in the pores. Therefore, most of the acid is disposed between the electrodes, in the separator and above the electrodes. (The acid below the plates does not contribute to the capacity unless there is a pump for acid circulation). Thus, the necessary amount of acid can be added to the cell by adjusting the mutual distance between the electrodes and by changing the height of the cell jar. The acid located outside the electrodes must be made available to the reaction sites by diffusion or migration to the interior of the electrodes. Thus, it will be realized that the electrodes must be thin and porous to allow for a fast transport of acid. Too much acid outside the electrodes is of no advantage, since not all of it can be used sufficiently, but will increase both the weight of the battery and the inner ohmic resistance.

Recently lead acid batteries have been designed to function as "sealed cells" which means that neither water decomposed to oxygen and hydrogen during charge nor water vapour can escape from the battery. The invention solves the problem of topping up i.e. adding water to the battery to replace what has been lost due to gassing and evaporation. The principle is to have oxygen, which starts to evolve at the positive electrode when about 80% of the discharged capacity has been recharged, transferred to the negative electrode where it is reduced back to water. This also means that hydrogen gas will not be evolved since normally that process does not occur until the negative electrode is fully recharged. It is, however, important for the function of a sealed lead acid battery that the distance between the positive and negative electrode is small for a fast transport of oxygen, which contradicts the demand of acid volume available for discharges. Especially the capacity at low currents where the active material has to be deeply discharged, is impaired. Sometimes the separator is not even filled with electrolyte in order to enable oxygen to flow freely to the negative electrode. The capacity of such cells with starved electrolyte is of course still lower. Organic materials cannot be used in sealed cells, at least not in contact with lead dioxide, due to the formation of $CO_2$ which is not reacting in the cell and thus will increase the pressure. Therefore, the separators for sealed lead acid batteries are made from glass wool which also has a good wicking effect.

SUMMARY OF THE INVENTION

One object of the invention is to provide a positive electrode design which eliminates various problems in the manufacture of electrodes.

Another object of the invention is to provide a design of electrodes which enables the positive electrodes to be made in a unique way at a low cost.

A further object of the invention is to provide a negative electrode of a unique design to obviate some disadvantages of the present designs and to save weight.

A still further object of the invention is to eliminate some grid elements in now existing tubular electrodes that cause short life, and to exclude a bottom bar of tubular electrodes from this new design, and further, to apply to the electrode a new and unique shield for the upper frame.

Still another object of the invention related to the elimination of various production problems is to provide an electrode design which permits filling of the electrodes with a paste of low viscosity.

The invention will also provide means to apply pressure to the active material in a unique way, the means being no obstacles for the current flow between the positive and negative electrodes.

Further, the object of the invention is also to provide an electrode having an arbitrary amount of acid in a reservoir without having the active material of the electrode remotely situated with regard to the opposite electrodes.

Another object of the invention is to provide a new method of making grids and applying them to the electrode according to the invention.

It is further the object of the invention to provide electrodes suitable for a new battery design well adapted to function as a sealed, maintenance-free lead acid battery with small inter electrode distances and acid reservoirs.

To attain the foregoing objectives as well as other advantages there has been devised electrodes consisting of two or more parts each of which is a frame of plastic with recesses. These recesses have been furnished with the conducting parts of a grid of principally the same design as for a tubular electrode and material of lead compounds, to be electrochemically transformed to active material, and the recesses finally sealed off by a weave or a similar porous material. The parts are thereafter put together, back to back, to constitute the electrode.

A preferred embodiment of a sealed maintenance-free lead acid battery comprises a plurality of positive electrodes having two parts with V-shaped recesses being furnished with grids and active material and sealed off, said parts being put together back to back, a plurality of flat, pasted negative electrodes, said electrodes of opposite polarity being separated by flat, thin, microporous glass wool separators, the acid contained in said separators and in acid reservoirs of non-compressable porous material placed between said parts of said positive electrodes and finally all said elements included in an airtight box having at least one pair of posts for the connection of the battery to any equipment to be served by said battery.

DESCRIPTION OF PREFERRED EMBODIMENTS OF THE INVENTION

A lead acid battery electrode construction according to the invention comprises at least two plastic frame portions 1 containing grid members 2 and active material 3. The electrode is sealed off by means of a porous material on those sides of the electrode that are opposite the counter electrode.

Figure 1:
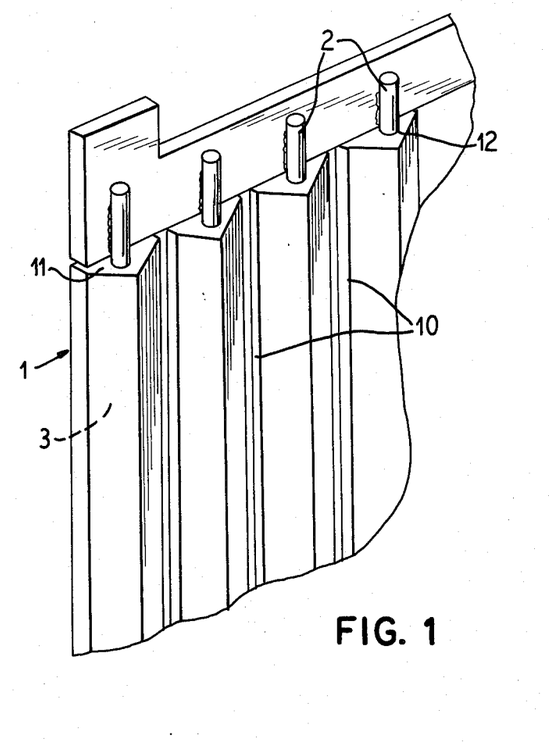
FIG. 1 is a view of a portion of a frame which is intended to be used together with another frame portion of the same kind in an electrode according to the invention to carry a grid and the active material.
Figure 6:
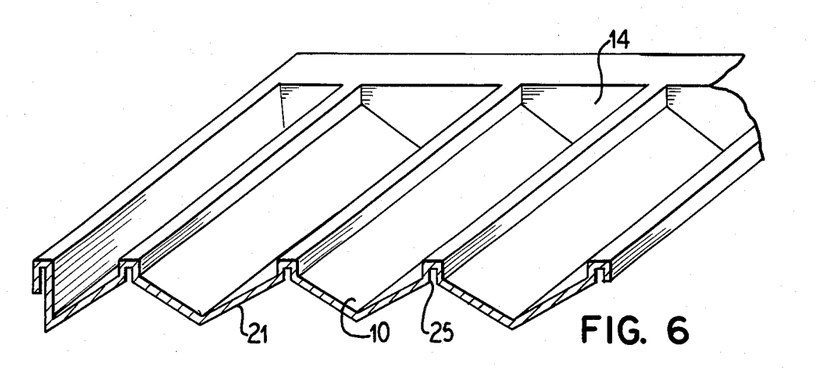
FIGS. 6 and 7 are perspective views of frame portions and details that are used for sealing off the electrodes.

FIG. 1 is a perspective view of one embodiment of a frame portion which forms the electrode. This frame portion 1 is preferably made by vacuum forming from e.g. 0.15 mm PVC foil. It is made with V-shaped recesses 10 with end walls 11 of the same piece of plastic. There are holes 12 in one end wall 11 to allow the spines to be pushed into the frame. There may be in a frame portion several recesses after each other, each with holes or slits for the spines. Instead of holes, slits 13 can be used. It would also be possible to provide the flap 14, FIG. 6, with other recesses, as continuations of the recesses 10, to receive either the upper, preferably conical portions of the spines or said upper portions and the upper frame as well. To fit to this first frame portion of the electrode, another frame portion is made so that the portions when put together back to back, form a parallelepipedic body with two sides missing.

Figure 3:
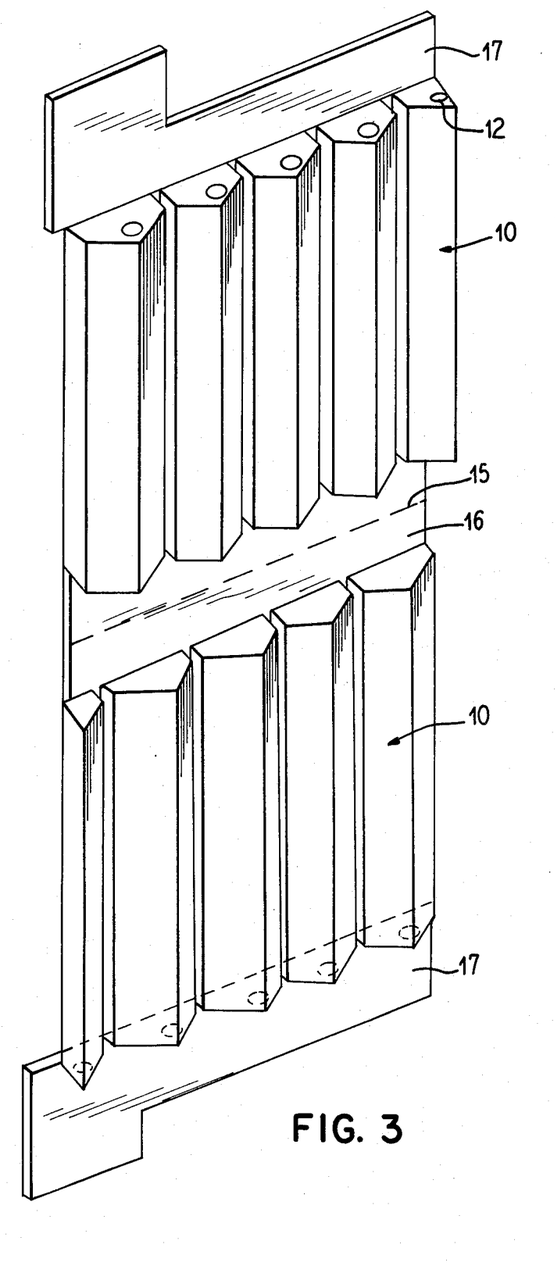
FIG. 3 is a perspective view of a double frame with V-shaped recesses.

The frame portions are preferably made in one piece, FIG. 3, which is folded along line 15 after the recesses have been filled and sealed off. Alternatively the folding can be made along a line parallel to the length of the recesses when the portions are disposed side by side. It would also be possible to fold two side portions over a central portion, if the electrode is very wide. The intermediate part 16 of the frame in FIG. 3 is adapted to constitute a plate support, after folding of the parts, FIG. 9. Such support corresponds to the height of the bottom bar of a tubular electrode and serves to isolate the electrode from sludge, which may have gathered at the bottom of the cell jar and which could otherwise cause short circuits.

The frame in FIG. 3 differs from that in FIG. 1 also by the extra material 17 of the foil included in the frame. These parts are used for shielding of the upper frames of the grids 2. The shield is made by wrapping the foil 17 around the lugs and the upper frames of the grids 2 after the two frame portions have been put together. The free ends of the foils are heat sealed or glued.

Figure 2:
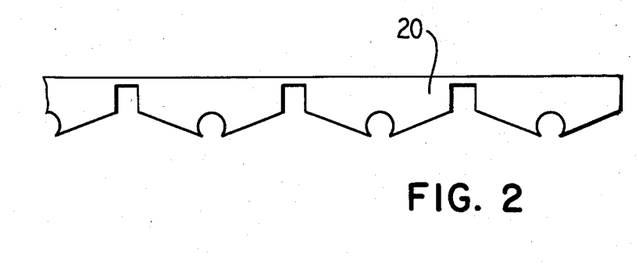
FIG. 2 shows an end-sealing and supporting plastic bar.

Plastic bars 20 are inserted in the frame when the grids have been applied. The plastic bars 20 are formed to fit the shape of the recesses as well as the diameter of the spines. Several such bars can be applied at predetermined distances along the frame to stabilize the construction mechanically which is necessary for long electrodes.

According to the invention it is possible to use a paste of low viscosity for application in the recesses. In such a case it is advantageous to use the frame 1 FIG. 1. In order to combine two effects: no penetration of paste during filling and diffusion of acid through the wall during charges and discharges, the porous frame 1 is impregnated by a material, which does not dissolve in the paste fluid which is chemically neutral or basic, but dissolves in the sulphuric acid that is used for formation of the paste to active material. Such materials could be e.g. polyvinylacetate or aluminiumhydroxide. Another way to cover the porous walls of the recesses is by a thin film of a material that will not dissolve in the paste fluid but in sulphuric acid, e.g. cellulose acetate, polyoximethylene or polyamid.

Figure 15:
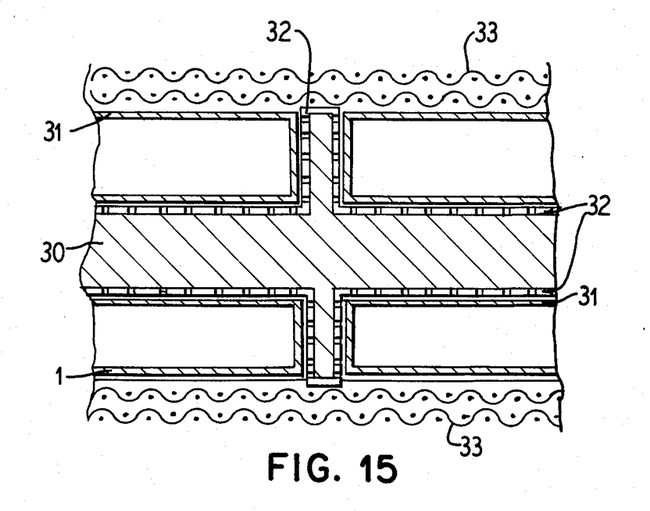
FIG. 15 is a cross-section of an electrode having a sheet of lead isolated and inserted into recesses made from a porous material.

According to the invention it is further possible to use a basis for the active material that is pure lead or lead alloy and which easily fits into a frame like the one in FIG. 15. Strips 30 of lead sheets are cut to sizes that fit the profile of porous frames 32 and are insulated by an acid resistant material 31, e.g. polyurethane at the upper and lower ends, put into the profiles and the porous frames 32 are covered and sealed off with a porous woven, non-woven or braided material 33. The formation procedure to transform lead to either porous lead dioxide or porous lead is well known as the Planté-formation.

Figures 4, 9:
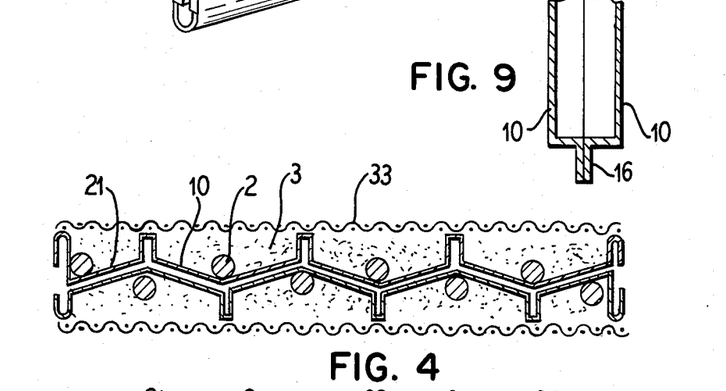
FIGS. 4 and 5 are cross-sections of various embodiments of electrodes according to the invention.
FIG. 9 appearing with FIG. 4 is a detailed cross-sectional view of an intermediate part of the foil, of which the frame portions in FIG. 3 are made.
Figure 5:
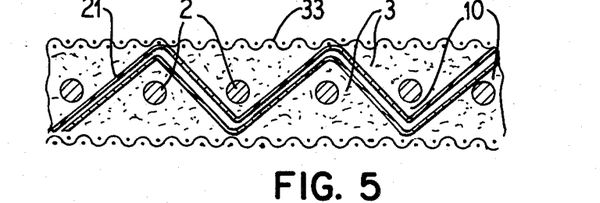
Figure 10:
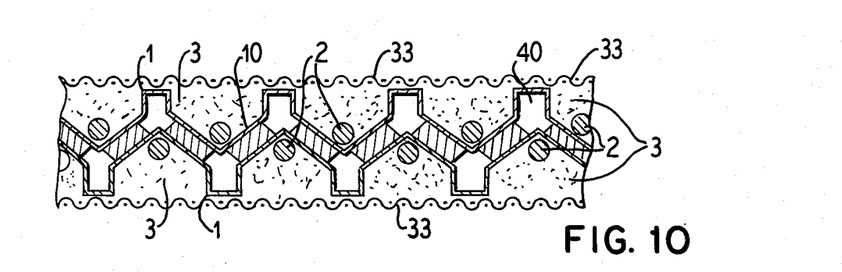
FIG. 10 is a view of the electrode according to the invention having the parts separated by porous bodies which do not fill the whole volume between the parts.
Figure 11:
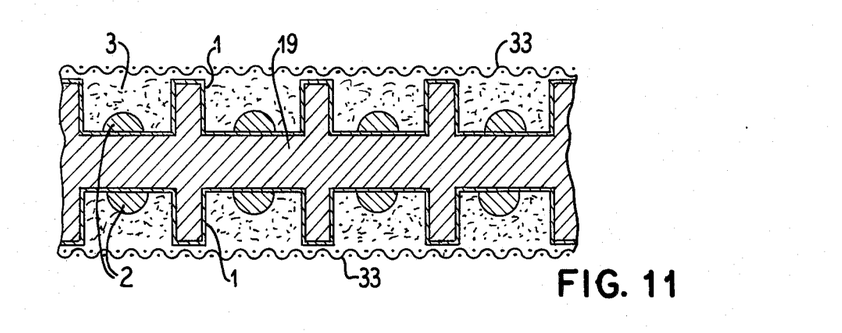
FIG. 11 is a view of the electrode according to the invention having the parts separated by a porous body.

The profile of the recesses is chosen so as to obtain as many as possible of the following properties: high volume of active material, best active material utilization and good mechanical support. In FIGS. 4 and 5 a number of different profiles are shown as examples of this, but the invention is in no way restricted to these profiles and includes any shape of the recesses. FIG. 11 shows a profile which has a maximum of active material within the volume of the recesses and also a good support of the bottom of the recesses. The support is made by a porous, mechanically strong material 21 which is surrounding the recesses. In FIG. 4 some of the volume is reduced viz. the material most remote from the counter-electrode. The profile thus obtained is then displaced a short distance, corresponding to half the width of the recess so that the recesses from both frames fit well to each other for a good mechanical support. A similar design is shown in FIG. 10. By the displacement of the frames one has to accept for the best utilization of the whole battery volume that the frames are made asymmetric.

Figure 7:
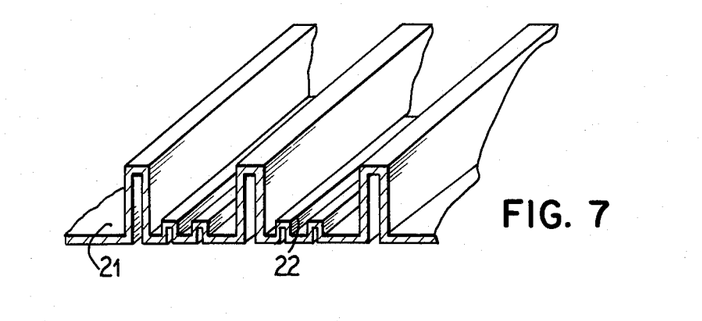
Figure 8:
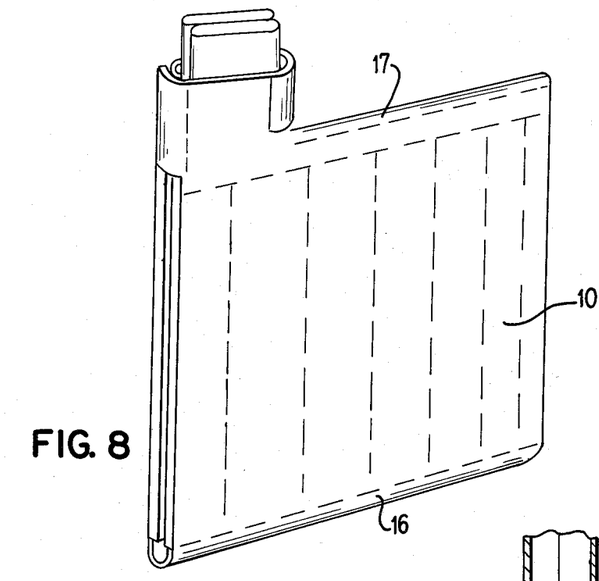
FIG. 8 appearing with FIG. 4 is a perspective view of an electrode according to the invention.

Another advantage of the profiles in FIGS. 4 and 5 as well as in FIG. 1 is that the gridspines are located automatically to the center of the electrode by the V-shaped recesses. To fix the spines at the right place when a certain profile is used, extra indentations 22 are made in the bottom of each recess or channel as is shown in FIG. 7.

In FIG. 5 all spines are disposed in the same plane of symmetry, which is advantageous when the spines are first located in the frames and when the frames have been pasted, sealed off and folded, then cast on or welded to an upper frame.

It is well known to those skilled in the art that electrodes for lead acid batteries must be arranged in the cell jar in a way so that a pressure is exerted on the active material. If this is not done, the active material will expand in operation and this leads to a higher porosity than intended. An uncontrolled high porosity means a higher utilization but also a shorter life. Such a pressure can to some extent be exerted on the electrodes by a suitable assembly technique or by swelling separators. According to this invention it is possible to apply a pressure by permitting a material placed between the parts of the electrode to swell when the sulphuric acid is acting upon it. A suitable material for this purpose is chloroprene rubber which swells at least 10% in sulphuric acid. The rubber in the form of sheets or rods is placed between the frames as they are folded or put together. The advantage of this method is the easy application and the assembling method does not require any special tool to force the electrodes into the cell jars. The expanding material is not an obstacle for the current flow between the electrodes which is another important advantage.

One important object of the invention is the use of the electrodes according to the invention in sealed, maintenance-free lead acid batteries. In such batteries, it is important to have a short distance between the electrodes but also a large amount of acid. The reservoir 40 in FIG. 10 serves the purpose of feeding the electrode with acid which is not available between the electrodes. The acid reservoir is located in one or several porous bodies made of an acid resistant, sturdy material. An example of such a material is the microporous PVC, commercially available under the registered trade mark "AMERSIL". It is not necessary that these porous bodies entirely fill the volume between the parts of the electrode as is shown in FIG. 10.

To enhance the advantage of the acid reservoir it is preferred to combine the use of the microporous body 40 with the porous frame 19 in FIG. 11 or having the frame in FIG. 10 perforated at least in that part thereof, that is used for the sealing by the porous material. Of course, it is possible to combine expanding pressure exerting bodies and porous acid holding bodies in one and the same electrode.

By the manufacture of electrodes according to the invention each frame, preferably of the design shown in FIG. 3, is provided with a grid having a plurality of straight spines which are no longer than the length of the recesses. The spines could have any cross-section, no larger than the cross-section of the recess, but round spines with a diameter of 2 to 4 mm are preferred. The spines do not require the fins, which are usual with the spines of a tubular battery, since they will center themselves in the V-shaped recesses, or are they locked due to the design of the frame, as is shown in FIG. 7 by the indentations 22. The recesses are filled with the material which later will be electrochemically transformed into active material. The material is a lead compound or a mixture of lead compounds in a dry or wet condition. Usually, powder of red lead is used for tube filling, and for pasting a rather still dough. By the filling of electrodes according to this invention such material could be used, but it has been found to be advantageous to use a free flowing powder obtained in a special procedure, e.g. spray drying, by the reaction between red lead or lead oxide or a mixture thereof with sulphuric acid. This material is referred to as granulated oxide. Still more advantageous is to make a low viscosity paste of a mixture of e.g. red lead and water which can easily be flushed into the recesses of the frame. Also, there could be added to this paste materials that will give the paste thixotropic properties. An example of such a material is silica. The filling operation is performed with the part or the parts in horizontal positin like when pasted electrodes are made. However, pasted electrodes have open grids and this demands a high viscosity (high density) paste which also means active material with low porosity. Since the frames which constitute the electrode according to this invention are made so that the paste stays in the recesses, first a much higher porosity of the active material can be obtained by using the low viscosity paste and secondly, only spines in one direction like in tubular electrodes are necessary, which makes a substantial lead savings.

Figure 12:
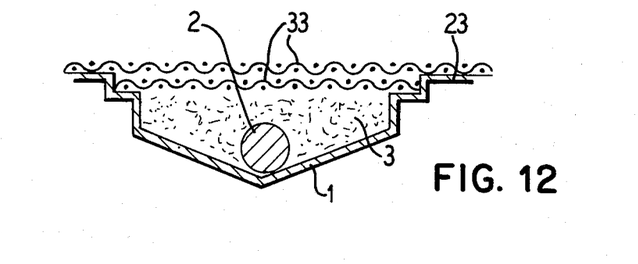
FIG. 12 is a cross-sectional view of a part of an electrode showing a cover which is a combination of glass, wool and polyester.
Figure 13:
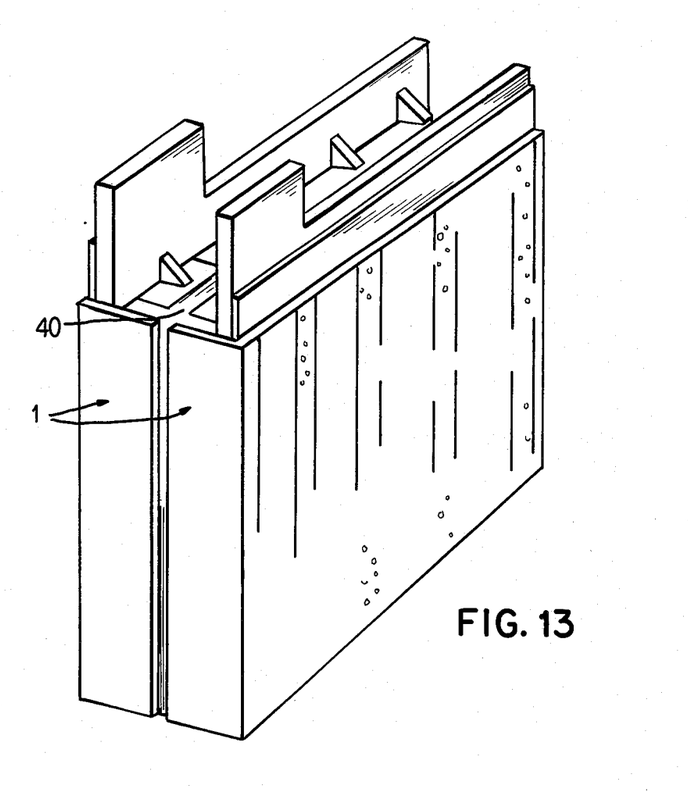
FIG. 13 is a perspective view of an electrode according to the invention having an acid reservoir located between the two halves of the electrode.
Figure 14:
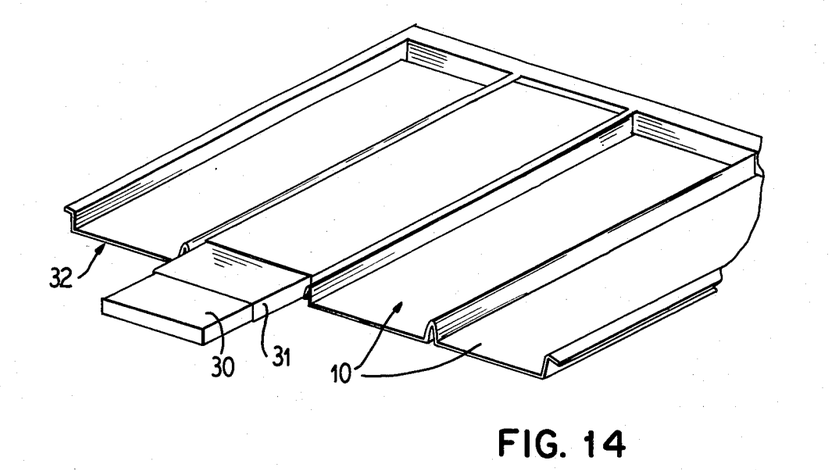
FIG. 14 is a perspective view of an electrode according to the invention that has a sheet of lead inserted in the recesses and which shall be electro-chemically formed to active material.

After filling (pasting) the frames are covered with a porous material e.g. a non-woven polyester, commercially available under the registered trade mark "VILEDON", produced by Carl Freudenburg Co. This cover—the retainer—is sealed to the upper side of the frames 1 on the surface 23 before the frames are put together to form the electrode. The sealing is preferably made by application of heat and pressure so that the materials of the frame and of the retainer are partly melted and joined. The materials can be heated by a glowing element or by ultra sound. They can also be joined by gluing though the invention is not restricted to any sealing method. In such a case it is preferred to use a string of hot melt adhesive first applied to the frames and then melted together with the retainer, when this retainr material is made from a high temperature melting material, e.g. glass wool. The cover can also be a combination of two or more materials of different properties e.g. glass wool and polyester fabric, FIG. 12, where the glass wool has the retaining effect and the polyester can be heat-sealed to the frame for the mechanical strength. The sealing operation takes advantage of the frame construction, viz. the grooves 25 (FIG. 6) formed between the recesses into which a suitable formed piece of metal or plastic can be introduced to take up the sealing pressure from the upper side or vice versa. The frame can thus withstand a high sealing pressure.

Since all active material in the form of powder or wet paste now is enclosed, the frames can be handled or turned upside down without loosing material which means that two frames may put together, back to back, to constitute an electrode for the further processing, or the frames may be processed further without yet beeing folded, or as individual frames. This further treatment is aiming at the production of electrodes having the ability to store and deliver electricity and is well known by those skilled in the art of making lead acid batteries.

An electrode made by applying two frames back to back contains two grids of lead or lead alloy but should not necessarily have a higher weight than the grid of a tubular electrode of similar size, since the two grids are made each with only approximately the half weight of a grid for a tubular electrode. These two grids are put close together and covered by the plastic foil to get the upper frames of the grids shielded. It may sometimes be found advantageous to apply only the spines 26 to the recesses and later join them by welding or soldering to another piece of lead being the upper frame 18. One advantage of using separate produced spines, cast or extruded, is the possibility to apply a reinforcement e.g. a alumina fiber, "Fiber FP" made by DuPont de Nemours, which makes it possible to use pure lead spines or spines of soft lead alloys in spite of their low tensile strength in the unreinforced condition. The upper frame of the grids can be covered by dipping or painting after the welding or soldering of the spines, viz. by a shielding material e.g. polyurethane. These two, here mentioned processes are accomplished before the frames are laid together to constitute the electrode.

Electrodes and methods to produce them, herein described, can, by those skilled in the art, be recognized to be applicable to positive electrodes. However, the invention is not limited to only positive electrodes but covers negative electrodes as well. Such electrodes are nowadays made as pasted electrodes. Recently it has been found that copper can be used instead of lead as the conducting and carrying material in negative electrodes. In such cases the copper grid is usually applied in the shape of expanded copper sheets, since copper is not so easy to make in the shape of a grid. Copper and even aluminum rods have been used, in addition to the lead grid in large negative electrodes to improve the grid conductivity and current distribution. A negative electrode according to this invention will be able to use a negative grid in the shape of copper rods which are connected by welding or soldering to an upper frame of copper or another material. Such rods and upper frames may be made much thinner and lighter in weight than lead, expecially compared to the lead grids used in pasted negative electrodes, and a considerable lower weight is achieved.

I claim:

1. An electrode for a lead-acid battery, comprising: a frame of an acid resistant plastic material holding a current grid and active material covered by a porous pervious web, said electrode comprising at least two portions, each portion constituting a frame portion of plastic material having a grid and surrounding active material disposed in shallow troughs and covered by a web on one side thereof, and interengageable with a similar frame portion, back to back, so as to jointly form the electrode, each said frame portion having a plurality of parallel, elongated recesses, each holding active material, and a grid spine of an electrically conductive material extending into the active material from an upper grid frame.

2. An electrode as claimed in claim 1, the bottoms of said recesses being V-shaped, and said recesses being arranged in such a manner that, with the frame portions put together and the grid spines disposed at the bottoms of the recesses, all grid spines are situated in essentially one and the same plane.

3. An electrode as claimed in claim 1, including acid-containing bodies being disposed between said frame portions.

4. A lead acid battery having at least some electrodes therein constructed according to claim 1.

5. A method of manufacturing an electrode for a lead-acid battery, comprising:
   (a) simultaneously forming a pair of interconnected electrode frame portions with recesses opening towards one side;
   (b) applying a conductive grid and active material into the frame portions;
   (c) covering the exposed surface of the active material with a porous permeable web;
   (d) securing the web to the frame portions; and
   (e) folding the interconnected back portions back to back to form the electrode.

* * * * *